United States Patent
Collins et al.

(10) Patent No.: US 8,459,372 B1
(45) Date of Patent: Jun. 11, 2013

(54) VOLTAGE SENSING DRILL WITH AUTOMATIC SHUT-OFF

(76) Inventors: Wayne Branson Collins, Willingboro, NJ (US); Michael J. Collins, Burlington, NJ (US)

( * ) Notice: Subject to any disclaimer, the term of this patent is extended or adjusted under 35 U.S.C. 154(b) by 484 days.

(21) Appl. No.: 12/558,402

(22) Filed: Sep. 11, 2009

Related U.S. Application Data

(60) Provisional application No. 61/096,179, filed on Sep. 11, 2008.

(51) Int. Cl.
*E21B 4/12* (2006.01)

(52) U.S. Cl.
USPC ............................ 173/2; 173/217; 361/49

(58) Field of Classification Search
USPC ............... 173/2, 5, 6, 109, 117, 217; 361/49, 361/50; 340/680
See application file for complete search history.

(56) References Cited

U.S. PATENT DOCUMENTS

| | | | | |
|---|---|---|---|---|
| 3,340,433 A | * | 9/1967 | Almquist | 361/50 |
| 3,683,354 A | * | 8/1972 | Enk | 408/16 |
| 3,907,136 A | | 9/1975 | Christides et al. | |
| 4,089,061 A | * | 5/1978 | Milewski | 708/305 |
| 4,292,571 A | * | 9/1981 | Cuneo | 318/17 |
| 4,310,269 A | | 1/1982 | Neu et al. | |
| 4,398,188 A | | 8/1983 | Feigal | |
| 4,410,846 A | | 10/1983 | Gerber | |
| 4,438,754 A | | 3/1984 | Nanny | |
| 4,626,834 A | * | 12/1986 | Caruthers | 340/649 |
| 4,644,335 A | | 2/1987 | Wen | |
| 4,722,021 A | * | 1/1988 | Hornung et al. | 361/49 |
| 4,755,805 A | | 7/1988 | Chau | |
| 4,820,962 A | * | 4/1989 | Millauer | 318/602 |
| 5,014,154 A | * | 5/1991 | White | 361/49 |
| 5,027,108 A | | 6/1991 | Gray | |
| 5,103,165 A | | 4/1992 | Sirattz | |
| 5,349,337 A | | 9/1994 | McCormick | |
| 5,684,466 A | | 11/1997 | Keating | |
| 5,877,618 A | | 3/1999 | Luebke et al. | |
| 6,091,337 A | * | 7/2000 | Arshad et al. | 340/662 |
| 6,867,703 B2 | | 3/2005 | Neykov | |
| 7,138,925 B2 | | 11/2006 | Nield | |
| 2003/0029050 A1 | | 2/2003 | Fungs et al. | |
| 2008/0196910 A1 | * | 8/2008 | Radle et al. | 173/2 |

* cited by examiner

*Primary Examiner* — M. Alexandra Elve
*Assistant Examiner* — Nathaniel Chukwurah
(74) *Attorney, Agent, or Firm* — Howson & Howson LLP

(57) ABSTRACT

A hand-held power drill incorporates an electronic voltage sensor having a sensing input conductively connected to the drill chuck so that a drill bit held by the chuck serves as a voltage sensing element. The electronic voltage sensor can operate an audible or visible warning device, and can also disable the drill motor, when the drill bit is in close proximity to a live wire. A two pole switch with successively closed sets of contacts allows the drill to be used as a voltage probe without operating the drill motor. An auxiliary by-pass switch gives the operator the option to operate the drill even when it is in proximity to a live wire.

9 Claims, 2 Drawing Sheets

VOLTAGE SENSING DRILL WITH AUTOMATIC SHUT-OFF

CROSS-REFERENCE TO RELATED APPLICATION

This application claims priority on the basis of provisional patent application 61/096,179, filed Sep. 11, 2008.

FIELD OF THE INVENTION

This invention relates generally to power tools, and more particularly to a hand-held power drill that includes a safety feature for warning the operator of imminent contact between the drill and a hidden electric supply line, and optionally, for preventing the drill from operating when there is a danger of contact with an electric supply line.

BACKGROUND OF THE INVENTION

When a hand-held power drill is being used in the vicinity of electric power conductors, there is a danger of personal injury due to contact between the drill and a live conductor, as well as a possibility of fire and damage to the wiring. These problems are particularly likely to occur when drilling through building walls, because the exact positions of electrical cables serving power outlets, lighting, etc., are usually unknown.

There is no easy way to determine the exact location of hidden wires, and consequently, drilling through insulated wiring is a common occurrence, and often requires removal of large parts of walls and rewiring.

SUMMARY OF THE INVENTION

This invention is a hand-held power drill having a safety feature providing a warning when the drill bit comes into close proximity to a live conductor. Optionally, the drill can be disabled automatically before it makes contact with the insulation surrounding a live cable.

The drill according to the invention incorporates a non-contact voltage sensor of the kind commonly available for use as a testing probe to detect AC current in insulated cables without the need for direct contact between the probe and the metal conductor or conductors of the cable. Such sensors are typically capable of detecting AC voltages from 40 volts RMS at a distance of several centimeters from the cable.

A preferred drill according to the invention comprises a housing, a motor, a drill chuck connected to and driven by the motor, and an electronic voltage sensor having a sensing input conductively connected to the drill chuck so that the drill bit held by the chuck serves as a voltage sensing element. The voltage sensor has an output that changes state when its sensing input senses that the drill bit is in proximity to an electric supply line.

Although it is not essential, it is preferred that the drill housing be composed primarily of an electrically non-conducting plastics material so that the principal exposed metal parts are the drill chuck and the drill bit. That way, the voltage sensor can respond reliably to the electric field generated by an AC current in a wire in the vicinity of the drill bit, but is less likely to respond to other electric fields.

The drill can include an alarm connected to the output of the voltage sensor for warning an operator when the drill bit is in proximity to an electric supply line. The drill can also include a relay having contacts through which operating power is supplied to the drill motor. This relay is connected to, and operable by, an output of the voltage sensor, to cut off operating power to the drill motor when the drill bit is in proximity to an electric supply line.

In a preferred embodiment, the drill includes both the alarm and the motor-disabling feature. A manually operable switch can be connected to by-pass the relay contacts so that an operator can operate the drill even though the bit is in proximity to an electric supply line.

It is therefore a general object of the invention to enhance safety and prevent damage due to inadvertent drilling through hidden electrical wiring.

Further objects and advantages of the invention will be apparent from the following description when read in conjunction with the drawings.

DETAILED DESCRIPTION OF THE PREFERRED EMBODIMENTS

Figure 1:
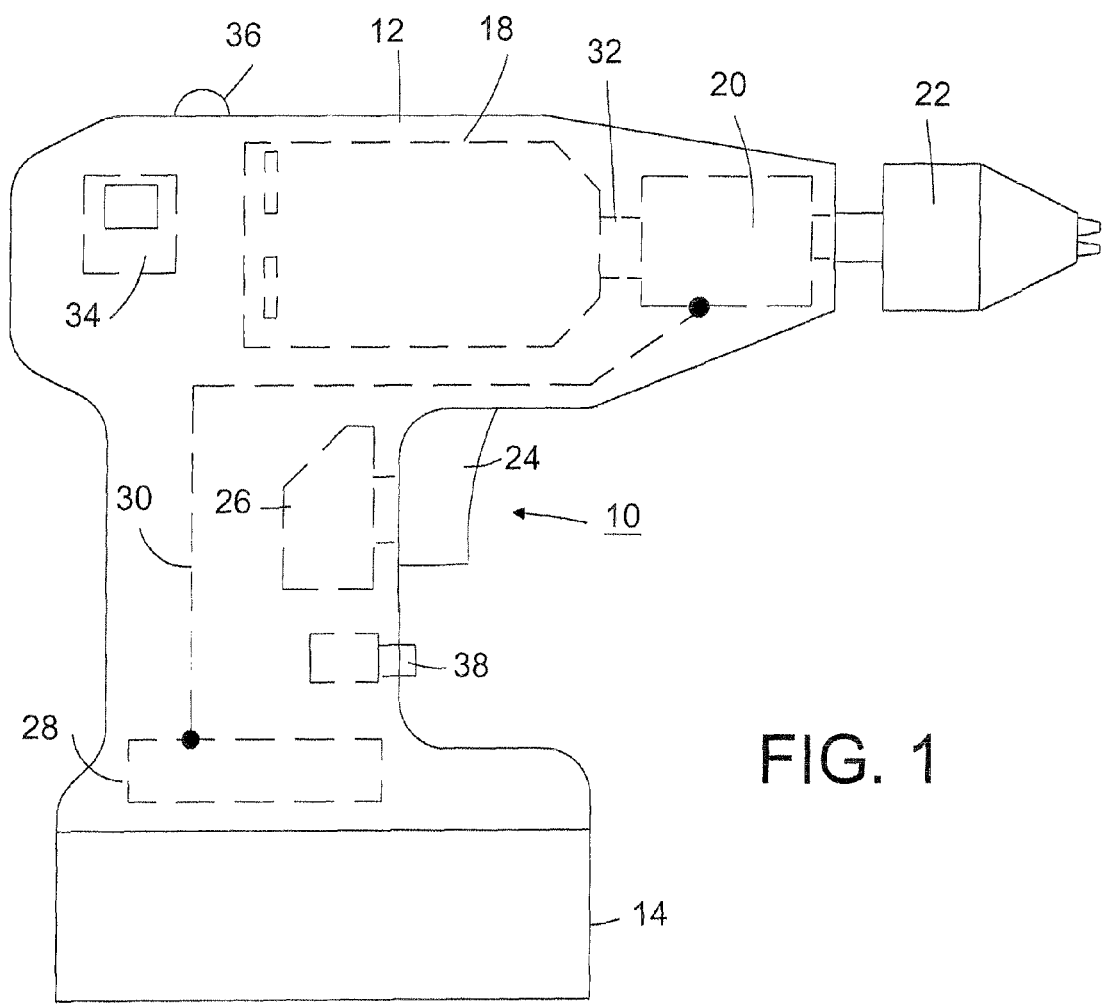
FIG. 1 is a schematic elevational view of a hand-held, voltage-sensing power drill in accordance with the invention.

The drill 10 of FIG. 1 is a battery-operated hand-held power drill having a housing 12, preferably composed of a suitable non-conducting plastics material such as ABS. A rechargeable battery 14, typically an eighteen or twenty four volt Li-ion battery is removably attached to the bottom of a handle portion 16 of the housing. A DC motor 18 drives a reduction gear unit 20, which in turn drives a chuck 22 which can be adjusted to hold drill bits in a range of sizes, typically up to one-half inch in diameter. An actuator 24, in the form of a "trigger," operates a switch assembly 26 inside the handle. The switch can be a single pole-single throw switch, but is preferably a two pole-single throw switch designed so that one of the poles closes upon a small movement of the trigger, and the other pole closes upon a further movement of the trigger. Optionally, the switch 26 can include a motor speed control so that the rotational speed of the motor can be varied depending on the pressure applied to the trigger 24. In the case of a variable speed drill, as in the case of a single speed drill, the switch is preferably designed so that a small amount of movement closed a first pole, and a further movement closes a second pole.

The drill housing also includes a voltage sensor 28, which can be any of a variety of conventional and commonly available non-contact voltage sensors, such as the model 40-600 voltage tester, available from Ideal Industries, Inc. Becker Place, Sycamore, Ill. 60178. Details of suitable non-contact voltage testers can be found in U.S. Pat. No. 5,103,165, granted Apr. 7, 1992, and in U.S. Pat. No. 5,877,618, granted Mar. 2, 1999. The disclosures of both patents are hereby incorporated by reference.

The voltage sensor input, that is, a probe conductor that forms part of the sensor, is connected through an insulated wire 30 to the reduction gear housing. The gearing can be connected to the motor 18 through an insulating shaft 32 if necessary to prevent the motor from interfering with the operation of the voltage sensor.

The drill housing also includes a buzzer 34 and a light-emitting diode (LED) 36, both of which are used to warn the operator that a drill bit in chuck 22 is in close proximity to a live wire.

Also included in the drill housing handle is a manually operable, two-position switch 38. This switch can be toggled to one or the other of its positions to enable the voltage sensor to shut off the motor, or to disable the automatic motor shut-off feature while still allowing the buzzer, the LED, or both, to provide an alarm indicating proximity to a live wire.

Figure 2:
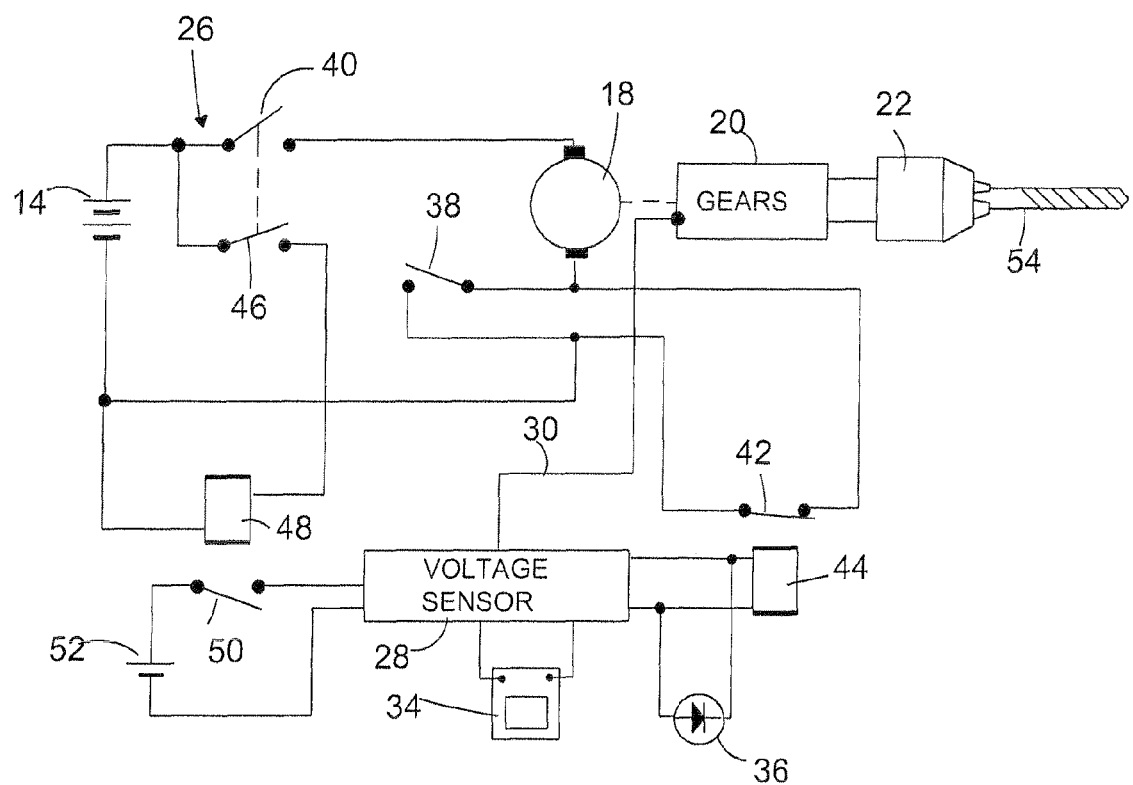
FIG. 2 is a schematic diagram of the electrical components of the drill.

In FIG. 2, which shows details of the wiring of the drill, battery 14 is connectable through contacts 40 of two-pole switch 26 to motor 18. The return circuit is though normally closed contacts 42 of relay 44, which are optionally by-passed by manual switch 38.

Contacts 46 of switch 26 are designed to close before contacts 40 close, and deliver power from battery 14 to relay 48, whose normally open contacts 50 deliver operating power from a low voltage battery 52 (typically a 3.5 volt battery) to the voltage sensor 28. Because switch contacts 46 close before contacts 40, the voltage sensor can be activated by a small movement of the trigger 24 (FIG. 1) without activating the drill motor 18.

An output of the voltage sensor 28 is connected to operate buzzer 34. Another output of the voltage sensor is connected to operate LED 36 and also to activate relay 44.

In the operation of the device, if switch contacts 46 are closed while switch contacts 40 are still open, the voltage sensor can respond to an electric field in close proximity to a drill bit 54 in chuck 22, and activate both the buzzer 34 and LED 36, each of which serves as an alarm, warning the operator that the bit is in proximity to a live wire. Thus the device can be operated without operating the drill.

If switch contacts 26 are also closed, the drill motor can operate. When the drill bit approaches a live wire, the voltage sensor not only activates the buzzer 34 and LED 36, but also activates relay 44, opening its normally closed contacts 42. Assuming that manual switch 38 is in its open position, opening of contacts 42 disables the drill motor 18, preventing the drill from damaging the wire.

Optionally, to prevent the drill from immediately restarting upon movement of the bit away from the live wire, a conventional latching circuit can be incorporated into a second set of contacts (not shown) on relay 44, so that the relay must be reset, for example by momentary release of the trigger 24 (FIG. 1) before drilling can be resumed.

When using the drill according to the invention in drilling through dry wall, for example, it is desirable to turn on all nearby light switches so that hidden wires are activated to the extent possible. This measure will reduce the likelihood of damage to unenergized wiring, and also has the potential advantage of improved lighting of the worksite.

Various modifications of the invention other than those described can be made. For example, although the invention has been described in the context of a DC battery-operated portable drill, it can also be embodied in a portable drill operated by AC line current, provided that suitable shielding is used to prevent the voltage of the drill operating power from activating the voltage sensor. It is also possible to utilize current from main battery 14 to operate the voltage sensor, thereby eliminating battery 52, provided that the voltage sensor can be designed to operate on the same voltage that operates the drill motor or suitable voltage reduction circuitry is utilized. Numerous other modifications, which will occur to persons skilled in the art can be made without departing from the scope of the invention as defined by the following claims.

What is claimed is:

1. A hand-held power drill comprising a housing, a motor, a drill chuck connected to and driven by the motor, and a non-contact, electronic, electric field-responsive voltage sensor having a sending input conductively connected to the drill chuck, whereby a drill bit held by the drill chuck serves as an electric field sensing element, said electric field-responsive voltage sensor having an output that changes state when said sensing input sensed that a drill bit held by the drill chuck is in proximity to an electric supply line, and said drill chuck being electrically isolated from said motor, whereby the motor is prevented from interfering with the operation of said electric field-responsive voltage sensor.

2. A hand-held power drill according to claim 1, in which said housing is housing is composed primarily of an electrically non-conducting material.

3. A hand-held power drill according to claim 1, including an alarm connected to said output of the electric field-responsive voltage sensor for warning an operator of the drill when a drill bit held in said chuck is in proximity to an electric supply line.

4. A hand-held power drill according to claim 1, including an relay having contacts through which operating power is supplied to said motor, said relay being connected to and operable by said output of the electric field-responsive voltage sensor, cutting off operating power to said motor when a drill bit in said chuck is in proximity to an electric supply line.

5. A hand-held power drill according to claim 1, including an alarm connected to said output of the electric field-responsive voltage sensor for warning an operator of the drill when a drill bit held in said chuck is in proximity to an electric supply line, and a relay having contacts through which operating power is supplied to said motor, said relay being connected to and operable by said output of the electric field-responsive voltage sensor, cutting off operating power to said motor when a drill bit in said child is in proximity to an electric supply line.

6. A hand-held power drill according to claim 1, including an alarm connected to said output of the electric field-responsive voltage sensor for warning an operator of the drill when a drill bit held in said chuck is in proximity to an electric supply line, a relay having contacts through which operating power is supplied to said motor, said relay being connected to and operable by said output of the electric field-responsive voltage sensor, cutting off operating power to said motor when a-drill bit in said chuck is in proximity to an electric supply line, and a manually operable switch connected to by-pass said contacts, whereby an operator can operate the drill even though, the bit is in proximity to an electric supply line.

7. A hand-held power drill according to claim 1, including a switch having two sets of contacts, a first of said sets of contacts being connected to deliver operating power to said electric field-responsive voltage sensor, and a second of said sets of contacts being connected to deliver operating power to said motor, and a manually operable switch actuator movable in a first direction said contacts being connected to said twitch actuator so that the first set closes when the actuator teaches a first position along said first direction, and the second set closes with the actuator reaches a second position along said first direction, the second position being spaced from said first position whereby the contacts of the first and second sets close sequentially.

8. A hand-held power drill according to claim 1, further comprising an electrically insulating connecting shaft through which said drill chuck is connected to and driven by the motor.

9. A hand-held power drill according to claim 1, further comprising a reduction gear unit connected between said motor and said drill chuck, and an electrically insulating connecting shaft through which said gear unit is connected to and driven by the motor.

* * * * *

UNITED STATES PATENT AND TRADEMARK OFFICE
CERTIFICATE OF CORRECTION

PATENT NO. : 8,459,372 B1
APPLICATION NO. : 12/558402
DATED : June 11, 2013
INVENTOR(S) : Wayne Branson Collins et al.

It is certified that error appears in the above-identified patent and that said Letters Patent is hereby corrected as shown below:

In the Specifications at column 4, line 34, "child" should read --chuck--
at column 4, line 56, "teaches" should read --reaches--

Signed and Sealed this
Sixth Day of August, 2013

Teresa Stanek Rea
*Acting Director of the United States Patent and Trademark Office*